(12) United States Patent
Kim et al.

(10) Patent No.: US 7,200,748 B2
(45) Date of Patent: Apr. 3, 2007

(54) E-MAIL PRINTER AND E-MAIL PRINTING METHOD HAVING AUTHENTICATION PROCEDURE

(75) Inventors: Young-hoon Kim, Gyeonggi-do (KR); Sang-yong Han, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 755 days.

(21) Appl. No.: 10/153,914

(22) Filed: May 24, 2002

(65) Prior Publication Data

US 2003/0115462 A1   Jun. 19, 2003

(30) Foreign Application Priority Data

Dec. 18, 2001   (KR) ................. 2001-80904

(51) Int. Cl.
*H04L 9/00* (2006.01)
(52) U.S. Cl. ...................... 713/168; 713/155
(58) Field of Classification Search ............... 713/168
See application file for complete search history.

(56) References Cited

U.S. PATENT DOCUMENTS

| | | | | |
|---|---|---|---|---|
| T102,102 | I4 * | 8/1982 | Bolle et al. | 271/298 |
| 4,549,825 | A * | 10/1985 | Fish et al. | 400/692 |
| 5,295,181 | A * | 3/1994 | Kuo | 379/100.07 |
| 5,358,238 | A * | 10/1994 | Mandel et al. | 271/298 |
| 5,513,013 | A * | 4/1996 | Kuo | 358/448 |
| 5,633,932 | A * | 5/1997 | Davis et al. | 713/176 |
| 5,704,609 | A * | 1/1998 | Mandel et al. | 271/290 |
| 5,815,555 | A * | 9/1998 | Cairo | 379/93.07 |
| 5,956,154 | A * | 9/1999 | Cairo | 358/434 |
| 6,268,926 | B1 * | 7/2001 | Okimoto et al. | 358/1.15 |
| 6,333,791 | B1 * | 12/2001 | Okimoto et al. | 358/1.18 |
| 6,389,456 | B1 * | 5/2002 | Okimoto | 709/206 |
| 6,393,463 | B1 * | 5/2002 | Fuchigami | 709/206 |
| 6,426,799 | B1 * | 7/2002 | Okimoto et al. | 358/1.15 |
| 6,532,496 | B1 * | 3/2003 | Iwata | 709/245 |
| 6,691,187 | B1 * | 2/2004 | Schwerin | 710/62 |
| 6,750,982 | B1 * | 6/2004 | Takaira et al. | 358/1.9 |
| 6,854,121 | B2 * | 2/2005 | Barnard et al. | 719/315 |
| 6,862,583 | B1 * | 3/2005 | Mazzagatte et al. | 705/64 |
| 6,975,419 | B2 * | 12/2005 | Staas et al. | 358/1.15 |
| 2001/0051064 | A1 * | 12/2001 | Yokoyama | 400/70 |
| 2002/0054336 | A1 * | 5/2002 | Yamaguchi | 358/1.15 |
| 2002/0075506 | A1 * | 6/2002 | Stevenson et al. | 358/1.15 |
| 2002/0116544 | A1 * | 8/2002 | Barnard et al. | 709/324 |
| 2002/0157028 | A1 * | 10/2002 | Koue et al. | 713/202 |
| 2002/0176106 | A1 * | 11/2002 | Hosoda | 358/1.14 |
| 2002/0191210 | A1 * | 12/2002 | Staas et al. | 358/1.15 |
| 2002/0191211 | A1 * | 12/2002 | Miller et al. | 358/1.15 |
| 2002/0194307 | A1 * | 12/2002 | Anderson et al. | 709/219 |

(Continued)

OTHER PUBLICATIONS

Leuf et al., "Outlook 2000 in a Nutshell", 2000, O'Reilly.*

*Primary Examiner*—Nasser Moazzami
*Assistant Examiner*—David Garcia Cervetti
(74) *Attorney, Agent, or Firm*—Staas & Halsey LLP

(57) ABSTRACT

An e-mail printer having an authentication procedure includes an e-mail receiving unit that includes a storage device to store e-mail which is received in a predetermined memory area allocated to each user and an authentication device to authenticate the user so that the user accesses the storage device.

28 Claims, 4 Drawing Sheets

U.S. PATENT DOCUMENTS

| | | | |
|---|---|---|---|
| 2003/0020953 A1* | 1/2003 | Van Den Tillaart et al. | 358/1.15 |
| 2003/0025934 A1* | 2/2003 | Takamiya | 358/1.15 |
| 2003/0081261 A1* | 5/2003 | Tanimoto | 358/400 |
| 2004/0008373 A1* | 1/2004 | Yamamoto | 358/1.15 |
| 2005/0041266 A1* | 2/2005 | Silverbrook et al. | 358/1.15 |
| 2005/0046880 A1* | 3/2005 | Asai et al. | 358/1.6 |
| 2005/0152334 A1* | 7/2005 | Okamoto et al. | 370/351 |
| 2005/0168776 A1* | 8/2005 | Yamaguchi | 358/1.15 |

* cited by examiner

E-MAIL PRINTER AND E-MAIL PRINTING METHOD HAVING AUTHENTICATION PROCEDURE

CROSS-REFERENCE TO RELATED APPLICATION

This application claims the benefit of Korean Application No. 2001-80904, filed Dec. 18, 2001, in the Korean Intellectual Property Office, the disclosure of which is incorporated herein by reference.

BACKGROUND OF THE INVENTION

1. Field of the Invention

The present invention relates to a printer and a printing method, and more particularly, to a printer and a printing method in which received e-mail is stored in a memory area allocated to each user, and the stored e-mail is confirmed through an authentication procedure.

2. Description of the Related Art

A printer having an e-mail receiving function is referred to as an e-mail printing device. The e-mail printing device has both an e-mail receiving function and an e-mail printing function.

FIG. 1 is a schematic diagram of a printing system with a printer having a conventional e-mail receiving function. The printing system 100 of FIG. 1 has mail clients, mail sending servers 1, 2, mail receiving servers 10, 20, and a printer 30 having an e-mail receiving function.

Mail clients and mail sending servers 1, 2 (i.e., sources) use a Simple Mail Transfer Protocol (SMTP) to send and receive e-mail. Mail receiving servers 10, 20 and the printer 30 (i.e., destinations) use Post Office Protocol Version 3 (POP3) to send and receive e-mail.

The printer 30 having an e-mail receiving function accesses each mail server 10, 20, and receives the e-mail. Then, the received e-mail is printed through the printer 30 according to the accessing order of the mail servers 10, 20. For example, it is assumed that the printer 30 sets N user accounts, and receives e-mail from the mail servers 10, 20 at a predetermined access time (for example, an hour). If it is the predetermined access time, the printer 30 accesses a first mail server 10, receives e-mail, and prints the received e-mail. The printer 30 repeats this process for the remaining mail servers to the N-th mail server 20. The conventional printer 30 only temporarily stores the received e-mail so as to print the e-mail, but does not store received e-mail in a separate storage device.

Then, if it is the next access time, such as, if an hour passes after the printer 30 last accessed each server 10, 20 according to the accessing order, the printer 30 again accesses each server 10, 20 according to the accessing order, receives the incoming e-mail, and prints the received e-mail. Therefore, e-mail received in each server 10, 20 is sequentially printed through the printer 30.

However, since the conventional printer 30 receives e-mail from preset user accounts without any condition and prints the received e-mail, e-mail for each user account cannot be distinguished. Also, since there are no security mechanism for the e-mail received by the printer 30, anybody can read the printed e-mail.

SUMMARY OF THE INVENTION

To solve the above and other problems, it is an objective of the present invention to provide a printer and a method of storing and confirming e-mail, in which e-mail sent from each mail server is stored in a memory area allocated to each user, and the received e-mail is confirmed through an authentication procedure.

Additional objects and advantages of the invention will be set forth in part in the description which follows and, in part, will be obvious from the description, or may be learned by practice of the invention.

To accomplish the above and other objectives, a printer having an e-mail receiving function according to an embodiment of the invention includes a storage device to store e-mail which is received in a predetermined one of memory areas corresponding to a user, and an authentication device to authenticate the user to allow the authenticated user to access the storage device.

According to another embodiment of the present invention, a method of storing e-mail in a printer having an e-mail receiving function, includes receiving e-mail sent to each of a plurality of users from each mail server in order of accessing time, and storing the received e-mail in a predetermined one of memory areas of the printer corresponding to each of the plurality of users.

According to an aspect of the invention, the receiving the e-mail further includes authenticating the mail server to be accessed.

According to a further embodiment of the present invention, a method of storing e-mail in a printer having an e-mail receiving function, includes receiving e-mail from a user account, and storing the received e-mail in a predetermined memory area of the printer allocated to the user account.

According to another aspect of the invention, the receiving the e-mail further includes receiving the e-mail from an authenticated mail server.

According to another embodiment of the present invention, a method of confirming e-mail stored in a printer having an e-mail receiving function, includes receiving e-mail sent to a user from each mail server in order of accessing time, storing the e-mail sent to the user in a predetermined memory area of the printer allocated to the user, and confirming the stored e-mail according to the user's selection after authentication.

According to an additional aspect of the invention, the receiving the e-mail further includes authenticating each mail server to be accessed.

According to still another embodiment of the present invention, a method of confirming e-mail stored in a printer having an e-mail receiving function includes receiving e-mail from a user account, storing the received e-mail in a predetermined memory area of the printer allocated to the user account, authenticating a user, and confirming the stored e-mail according to the authenticated user's selection.

According to a yet further aspect of the invention, the receiving the e-mail includes receiving the e-mail from an authenticated mail server.

BRIEF DESCRIPTION OF THE DRAWINGS

The above and other objects and advantages of the present invention will become more apparent and more readily appreciated by describing in detail preferred embodiments thereof with reference to the accompanying drawings in which.

DETAILED DESCRIPTION OF THE EMBODIMENTS

Figure 1:
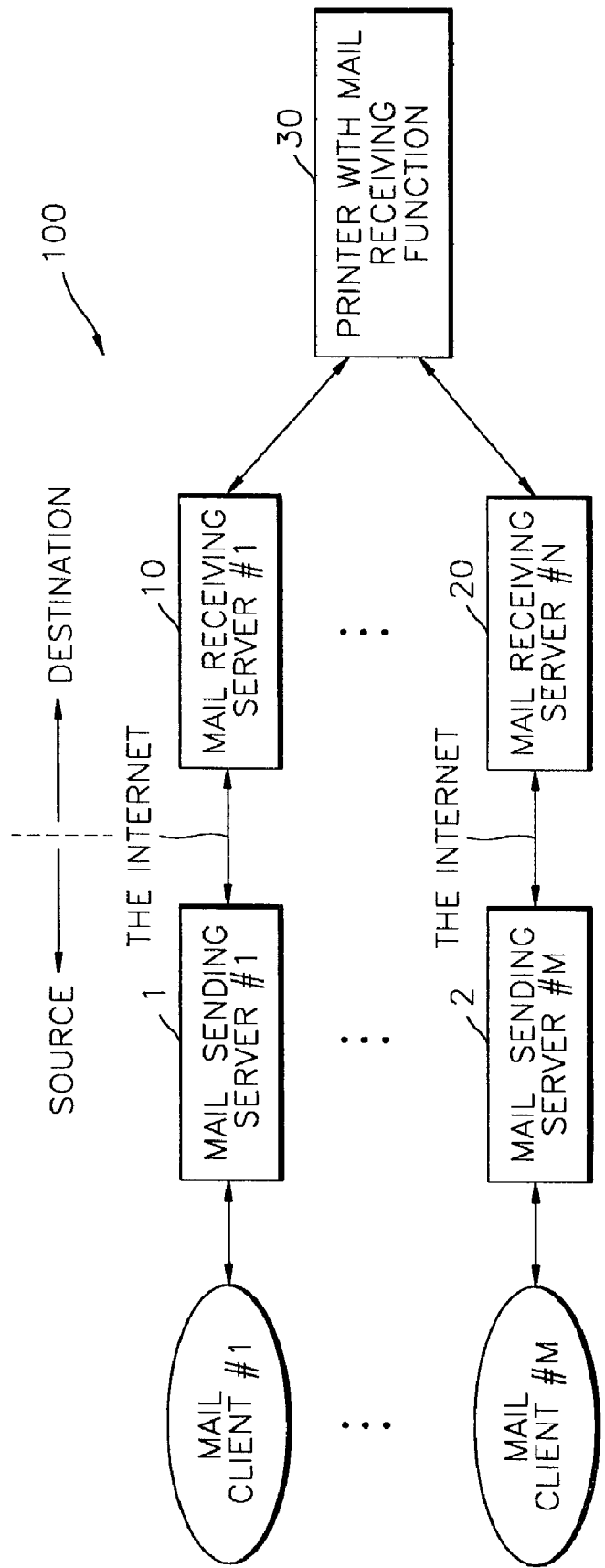
FIG. 1 is a schematic diagram of a printing system with a printer having a conventional e-mail receiving function.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
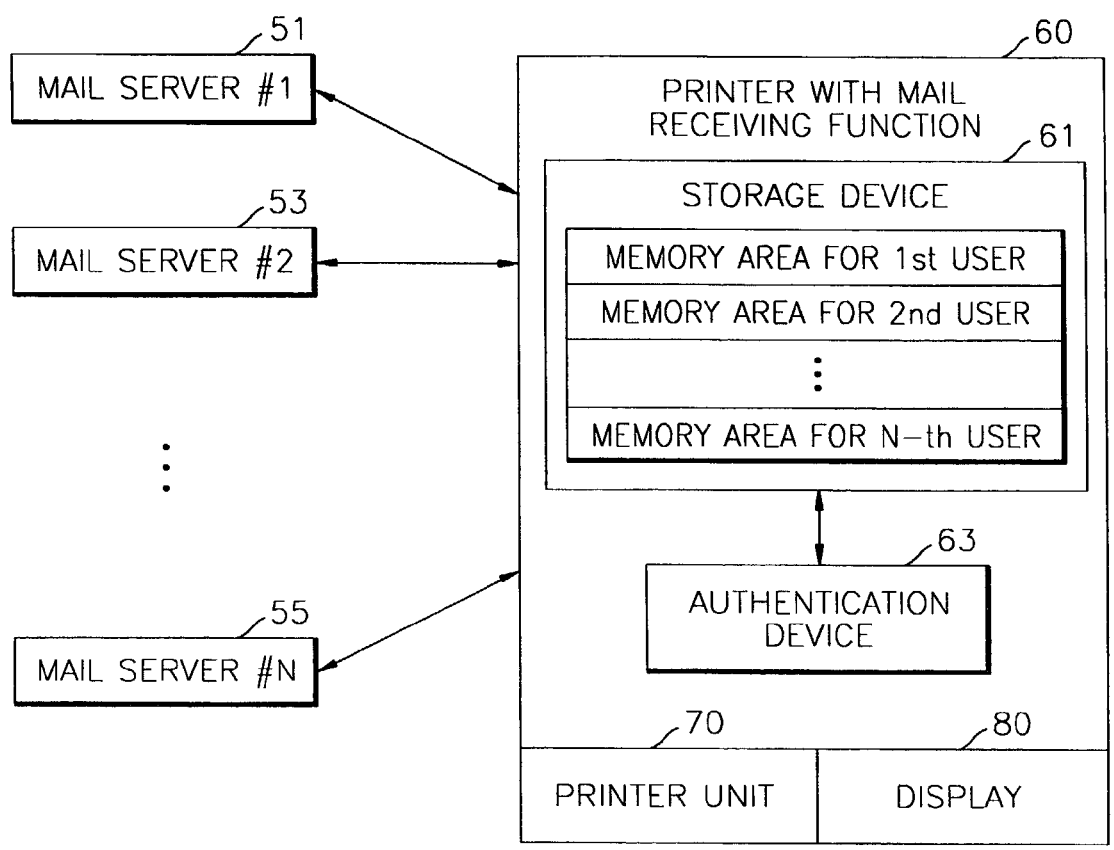
FIG. 2 is a schematic diagram of a printer having an e-mail receiving function according to an embodiment of the present invention.

Referring to FIG. 2, a printer 60 having an e-mail receiving function according to an embodiment of the present invention has a storage device 61 and an authentication device 63. The storage device 61 has a memory area allocated to each of a first through N-th users. The first through N-th memory areas store e-mails sent to the first through N-th users, respectively. The storage device 61 according to embodiments of the present invention is a memory device or a Hard Disc Drive (HDD). However, it is understood that the storage device 61 can also be other writeable media, such as solid state memories, magnetic recording media, Compact Disk Recordable (CD-R) or Compact Disk Rewriteable (CD-RW), writeable or rewriteable Digital Video Disk (DVD), Compact Disk Magneto Optical (CD-MO). Further, it is understood that ones of the memory areas for the users could be removable for use by the users apart from the printer 60.

The authentication device 63 authenticates each of the first through N-th users. Each of the first through N-th users can access a corresponding one of the allocated memory areas, and confirm (display or print) e-mail sent to the user using a printer unit 70 or a display 80. Also, the storage device 61 receives e-mails from each of the mail servers 51 through 55 and stores the received e-mails.

Figure 3:
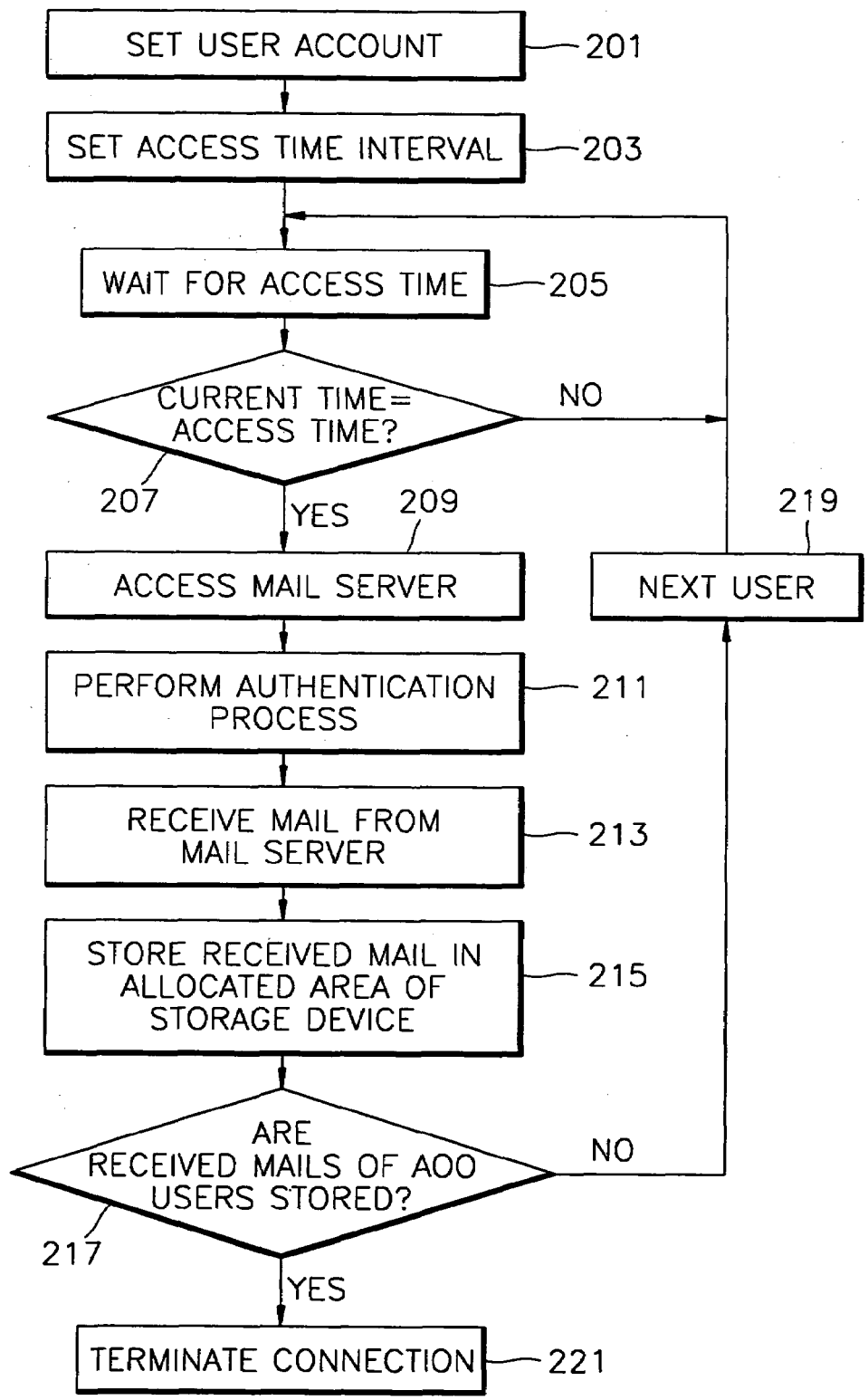
FIG. 3 is a flowchart of a process for storing e-mail according to an embodiment of the present invention.

FIG. 3 is a flowchart of a process of storing e-mail according to an embodiment of the present invention. Referring to FIGS. 2 and 3, the printer 60 can be set up for one or more user's accounts. The printer 60 sets N user accounts (operation 201), and each user sets a variety of items (for example, a mail server name, a user name, or a password) needed to receive the e-mails.

Also, the user can set an access time interval (operation 203) so that the printer 60 accesses each mail server 51 through 55 at a predetermined time interval, and receives the e-mails. The printer 60 waits for the access time (operation 205), determines whether or not the current time is the access time (operation 207), and if the current time is not the access time, the printer 60 waits for the access time (operation 205). It is understood that the printer 60 can access the mail servers 51 through 55 at other times, such as at a request of the user.

If the current time is the access time, the printer 60 accesses each mail server 51 through 55 according to the accessing order (operation 209), and performs an authentication procedure for each mail server 51 through 55, which the printer 60 accesses, (operation 211).

Then, according to the accessing order, the printer 60 receives each of the e-mails sent to the user (operation 213), and stores the received e-mails in a memory area of the storage device 61 allocated to the user in order of receiving time (operation 215). Therefore, in the memory area allocated to each user having a user account, e-mail sent to the user is stored in order of receiving time.

For example, the printer 60 access the first mail server 51, receives only new e-mails or all of the e-mails sent to a first user, and stores the received e-mails sent to the first user in a memory area allocated to the first user. After receiving and storing the e-mails from the first mail server 51, the printer 60 accesses the second mail server 53, receives additional e-mails sent to the first user, and stores the received additional e-mails. This accessing and receiving process is repeated sequentially to the N-th mail server 55. Therefore, the memory area allocated to the first user stores the e-mails received from each mail server 51 through 55 according to the accessing order.

It is determined whether or not received e-mails of all users are stored (operation 217). If the received e-mails of all users are not stored, the printer 60 prepares to receive e-mails sent to a next user (operation 219), and waits for the access time for the next user (operation 205).

Therefore, the printer 60 according to an embodiment of the present invention stores the e-mails sent to the first user in the memory area allocated to the first user, then stores the e-mails sent to a second user in the memory allocated to the second user, and repeats this process till the printer 60 stores the e-mails sent to the N-th user in the memory allocated to the N-th user.

If the received e-mails of all users (for example, from the first user to the N-th user) are stored, the printer 60 terminates connections to the mail servers 51 through 55. However, even when the connection is terminated, the printer waits for the access time (operation 205), and if the current time is the access time, the printer 60 repeats operations 207 through 221. Therefore, through this process the storage device 61 periodically receives e-mail sent to each user and sequentially stores the received e-mail.

Also, since the flowchart of other embodiments according to the present invention are similar to that shown in FIG. 3, other embodiments of the present invention will be explained referring to FIGS. 2 and 3. If it is the preset access time (operation 207), the printer 60 accesses the first mail server 51 according to the accessing order, receives e-mails sent to the first through N-th users from the first mail server 51 in operation 213, and stores the received e-mails sent in memory areas allocated to the first through N-th users, respectively, (operation 215). Then, the printer 60 access the second mail server 53, receives additional e-mails sent to the first through N-th users from the second mail server 53 (operation 213), and stores the received additional e-mails in memory areas allocated to the first through N-th users, respectively, (operation 215). If the printer 60 does not receive the e-mails sent to each user from all mail servers in operations 217 through 219, the printer 60 accesses the N-th mail server 55, and repeats the process of FIG. 3 until the printer 60 receives the e-mails for the first through N-th users from the N-th mail server 55.

Therefore, the storage device 61 receives the e-mails sent to the first through N-th users from the first mail server 51 and stores the received e-mails in the memory areas allocated to the first through N-th users, receives the e-mails sent to the first through N-th users from the second mail server 52 and stores the received e-mails in the memory areas allocated to the first through N-th users, and finally receives the e-mails sent to the first through N-th users from the N-th mail server 55 and stores the received e-mails in the memory areas allocated to the first through N-th users. Therefore, the memory areas allocated to the first through N-th users store the received e-mails sequentially.

After the printer 60 receives the e-mails sent to each of the users from the N-th mail server and stores the received e-mails, the printer 60 terminates the connections to the mail server 51 through 55. However, even when the connections are terminated, the printer 60 waits for the access time (operation 205), and if the current time is the access time, the printer 60 repeats operations 207 through 221. Therefore, through this process the storage device 61 periodically receives e-mail sent to each user and sequentially stores the received e-mails.

Figure 4:
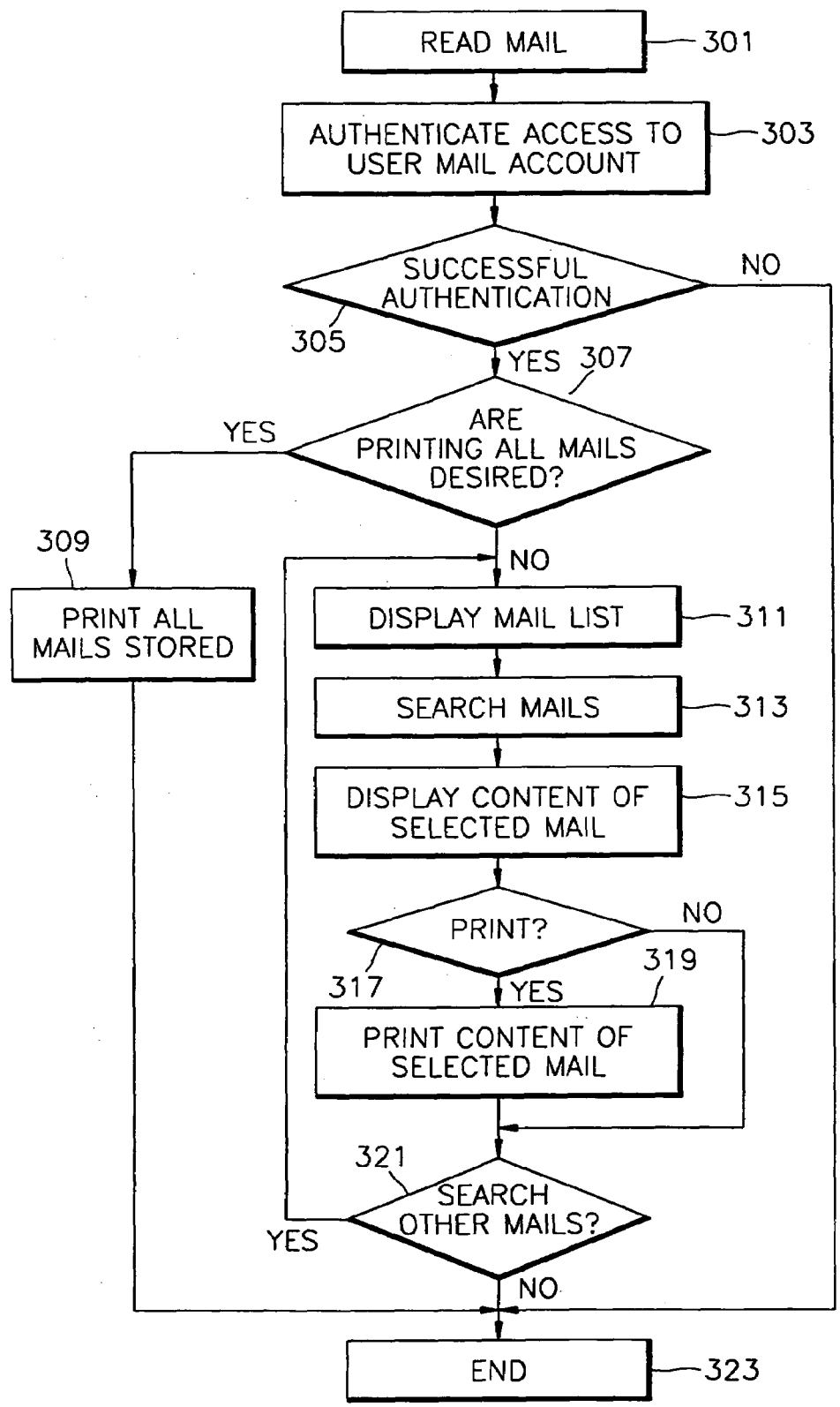
FIG. 4 is a flowchart of a process for confirming e-mail according to an embodiment the present invention.

FIG. 4 is a flowchart of a process for confirming e-mail according to another embodiment of the present invention. Referring to FIGS. 2 and 4, if the user selects 'viewing' to read the e-mails stored in the storage device 61 (operation 301), the printer 60 performs a predetermined procedure to authenticate access to the user's e-mail account (operation 303). For example, the printer 60 may compare an input identifier for the user account with a preset identifier for the user account so as to perform the authentication procedure. The authentication procedure is performed in the authentication device 63.

The authentication device determines whether or not the authentication is successful (operation 305), and if the authentication has failed, the 'viewing' is finished (operation 323). If the authentication is successful, the user can access a memory area of the storage device 61 allocated to the user. The user can print all stored e-mails using the printer unit 70, or select to display an e-mail list using the display 80 (operation 307).

If the user wants to print all e-mails stored in the memory, the printer prints all stored e-mails using the printer unit 70 (operation 309). Therefore, 'viewing' of the e-mails is terminated (operation 323). However, if the user wants to display the list of the e-mails stored in the memory, the list of the stored e-mails is displayed through the display 80 (operation 311).

If the user searches the list of the e-mails in operation 313, and selects a desired e-mail to read, the content of the selected e-mail is displayed through the display 80 (operation 315). The user confirms the content of the e-mail, and if the user wants to print the e-mail (operation 317), the selected e-mail is printed through the printer unit 70 (operation 319). However, if the user does not want to print the e-mail, operation 321 is performed.

Then, in operation 321, if the user wants to search other e-mails, operation 311 is performed. However, if the user does not want to search other e-mails, the 'viewing' of the e-mails is finished.

According to an embodiment of the invention, one or both of the methods performed in the flowcharts shown in FIGS. 3 and 4 are performed using a computer, which performs the methods using computer software encoded on a computer readable medium.

As described above, according to the printer and method for storing and confirming of the present invention, a separate storage device is used such that received e-mail is kept for a long time, and a predetermined authentication procedure is needed to confirm (display or print) e-mail stored in a memory area allocated to each user account such that security of each user's e-mail is improved.

Therefore, the printer and method of storing and confirming protects each user's privacy, and improves security of e-mail which is one of the core elements in many work places.

So far, specific embodiments have been explained in the drawings and specification, and though specific terminologies are used here, those were only to explain the present invention. However, the present invention is not restricted to the above-described embodiments and many variations are possible within the spirit and scope of the present invention. The scope of the present invention is not determined by the description but by the accompanying claims and equivalents thereof.

What is claimed is:

1. A printer having an e-mail receiving function comprising:
    a storage device comprising memory areas allocated to each of a plurality of users, to store received e-mail in a predetermined one of the memory areas corresponding to each of the plurality of users;
    an authentication device to authenticate the plurality of users so that the authenticated ones of the users are enabled to access said storage device; and
    a printer unit to print the received e-mail.

2. A method of storing e-mail in a printer having an e-mail receiving function, comprising:
    receiving e-mails sent to each of a plurality of users from mail servers in order of accessing time; and
    storing the received e-mails in corresponding predetermined memory areas of the printer allocated to the plurality of users.

3. The method of claim 2, wherein said receiving the e-mails further comprises authenticating ones of the mail servers to be accessed.

4. A method of storing e-mail in a printer having an e-mail receiving function, comprising:
    receiving at the printer e-mails from each of a plurality of user accounts; and
    storing the received e-mails in predetermined memory areas of the printer corresponding to each of the plurality of user accounts.

5. The method of claim 4, wherein said receiving the e-mails comprises receiving the e-mails from an authenticated mail server.

6. A method of confirming e-mail stored in a printer having an e-mail receiving function, comprising:
    receiving e-mails sent to each of a plurality of users from each of a plurality of mail servers in order of accessing time;
    storing the received e-mails in corresponding memory areas of the printer allocated to each of the users; and
    confirming the stored e-mail according to one of the users' selection after authentication of the one user.

7. The method of claim 6, wherein said receiving further comprises authenticating each mail server to be accessed.

8. A method of confirming e-mail stored in a printer having an e-mail receiving function, the method comprising:
    receiving e-mails from each of a plurality of user accounts at the printer;
    storing the received e-mails in corresponding memory areas of the printer allocated to each of the user accounts;
    authenticating a user; and
    confirming the stored e-mails according to the authenticated user's selection.

9. The method of claim 8, wherein said receiving the e-mail comprises receiving the e-mail from an authenticated mail server.

10. A printer having an e-mail receiving function comprising:
    an e-mail receiving unit to receive e-mail sent to a receiving user;
    a storage device comprising storage areas allocated to a plurality of receiving users, said storage device to store the received e-mail in one of the storage areas which corresponds to the receiving user; and a printer unit to print the stored e-mail at a print command of the receiving user.

11. The printer of claim 10, wherein:
other e-mails sent to other users are received by said e-mail receiving unit and stored in remaining ones of the storage areas, and
said printer unit does not print the other e-mails at the print command of the receiving user.

12. The printer of claim 11, further comprising an authentication device to authenticate the receiving user such that the receiving user is enabled to access the one storage area, while non-authenticated users are not enabled to access the one storage area.

13. The printer of claim 10, further comprising a display to display the received e-mail at a display command of the receiving user.

14. The printer of claim 13, wherein:
the one storage area has an additional e-mail sent to the receiving user, and
said display displays a list of the received and the additional e-mails at a list command from the receiving user.

15. The printer of claim 14, wherein, while said display displays the list, the receiving user selectively prints ones of the listed e-mails.

16. The printer of claim 14, wherein, while said display displays the list, the user searches the listed e-mails using a search command.

17. The printer of claim 14, wherein, while said display displays the list, the user selects one of the listed e-mails to be displayed.

18. The printer of claim 17, wherein, while said display displays the list, said printer unit prints the selected e-mail using said printer unit.

19. The printer of claim 13, wherein:
the one storage area has an additional e-mail sent to the receiving user, and
said printer unit prints the received and additional e-mails at a print all emails command, but does not print other e-mails stored in the remaining storage areas.

20. A computer readable medium encoded with processing instructions for implementing a method of retrieving and printing e-mails performed by a computer in a printer, the method comprising:
accessing a mail server to retrieve an e-mail sent to a user;
retrieving the e-mail sent to the user;
storing the retrieved e-mail in a storage area of a storage medium in the printer corresponding to the user; and
printing and/or displaying the stored e-mail at a command from the user.

21. The computer readable medium of claim 20, further comprising:
retrieving other e-mails sent to other users; and
storing the retrieved other e-mails in other storage areas corresponding to the other users.

22. The computer readable medium of claim 21, wherein said printing and/or displaying the stored e-mail comprises printing and/or displaying the stored e-mail of the user, while not accessing the other e-mails of the other users stored in the other storage areas.

23. The computer readable medium of claim 21, wherein said retrieving the e-mail and the other e-mails further comprises retrieving ones of the e-mail and other e-mails on the mail server, accessing another mail server, and retrieving additional e-mails corresponding to the user and the other users from the additional mail server.

24. The computer readable medium of claim 21, wherein said retrieving the e-mail further comprises retrieving from the mail server ones of the e-mail and further e-mails corresponding to the user but not to the other users, accessing another mail server, and retrieving from the another mail server additional e-mails corresponding to the user but not to the other users.

25. The computer readable medium of claim 20, further comprising:
retrieving other e-mails sent to the user,
storing the retrieved other e-mails in the storage area, and
said printing and/or displaying the e-mail comprises displaying the e-mail and the other e-mails in a list.

26. The computer readable medium of claim 25, further comprising searching the list to find one of the listed e-mails.

27. The computer readable medium of claim 25, further comprising selecting one of the listed e-mails to be displayed, and printing the displayed e-mail.

28. The computer readable medium of claim 20, further comprising authenticating the user to allow the user to print and/or display the stored e-mail while not allowing non-authenticated users to print and/or display the stored e-mail.

* * * * *